United States Patent [19]

Downs

[11] Patent Number: 4,474,714
[45] Date of Patent: Oct. 2, 1984

[54] DIFFUSER APPARATUS

[75] Inventor: Ernest W. Downs, Cincinnati, Ohio

[73] Assignee: Endurex Corp., Loveland, Ohio

[21] Appl. No.: 514,326

[22] Filed: Jul. 15, 1983

[51] Int. Cl.³ .............................................. B01F 3/04
[52] U.S. Cl. ................................ 261/124; 210/221.1; 261/123
[58] Field of Search ....................... 261/122, 124, 123; 210/221.2; 209/170; 239/145, 554; 435/313; 422/231

[56] References Cited

U.S. PATENT DOCUMENTS

| | | | |
|---|---|---|---|
| 2,144,385 | 1/1939 | Nordell | 261/122 X |
| 2,221,346 | 11/1940 | Durdin, Jr. | 261/124 |
| 2,637,541 | 5/1953 | Rubin | 261/122 |
| 3,162,702 | 12/1964 | Yonner | 261/123 |
| 3,424,443 | 1/1969 | Thayer | 261/124 X |
| 3,606,985 | 9/1971 | Reed | 261/123 X |
| 3,711,072 | 1/1973 | Waldenville | 261/122 |
| 4,060,486 | 11/1977 | Schreiber | 261/122 X |
| 4,279,842 | 7/1981 | Belveal | 261/124 |

FOREIGN PATENT DOCUMENTS 493342  3/1930  Fed. Rep. of Germany ...... 261/122

Primary Examiner—Richard L. Chiesa
Attorney, Agent, or Firm—Pennie & Edmonds

[57] ABSTRACT

A diffuser apparatus for use in a sewage installation includes an elongated, one-piece body of substantially tubular outline in vertical section having a top wall, spaced sidewalls and a bottom wall. An end cap provides a closure for closing each end of the body above the region of the bottom wall to provide a flow path for liquid into and out of a chamber within said body. A plurality of ports are located along each sidewall and a nozzle extends either through one end cap of the top-wall for connecting the chamber to a source of compressed air. The flow path for liquid allows debris to flush clear of the chamber. The flow path, in the event that the ports become clogged, provides a distinct bubble pattern at the surface of the liquid during aeration.

16 Claims, 13 Drawing Figures

DIFFUSER APPARATUS

DESCRIPTION

1. Technical Field

The invention is in a diffuser for use in aerating a liquid within a tank. A principal use, however, is in aerating a liquid which may be a sewage/sludge mixture confined in an aerating tank of a sewage treatment installation. In operation, the diffuser functions to continuously release gas under pressure into the sewage/sludge mixture (hereinafter "liquid").

2. Background Art

Diffusers of the type considered herein have been used for many years. One representative diffuser of the prior art is described in U.S. Pat. No. 3,424,443 to P. M. Thayer. The diffuser described by Thayer includes an elongated body having a top wall and a pair of sidewalls which depend from the top wall in a general outward direction. A pair of plates are located at the ends of the body for supporting the top wall and sidewalls. The end plates are of elongated oval outline. A deflector of V-shaped outline is also supported between the end plates, and within the outline of the end plates. The deflector, more particularly, is supported between the end plates in a disposition such that its apex is toward the bottom of the diffuser, and the ends of the legs of the deflector are located both below and spaced from the ends of the sidewalls. The spacing, thus, forms an elongated opening. The top wall and sidewalls, as well as the deflector, are located within the confines of the end plates and delineate a chamber adapted to be communicated to a source of compressed air. A plurality of ports are located along the sidewalls above the elongated opening.

The diffuser described by Thayer is adapted to be submerged in a liquid tank of sewage treatment installation. In operation, air under a pressure at least equal to the hydrostatic pressure creates an air/liquid interface at a level which under normal operating conditions is just below the plurality of ports. The compressed air then may be released through the ports.

SUMMARY OF THE INVENTION

While the diffuser described by Thayer functions fairly well in the sewage treatment adaptation to continually release air under pressure to bubble through the liquid, the diffuser of the invention is considered to provide an improvement over Thayer, in both its structural make-up and operation.

The diffuser of the invention is elongated in length, including a top wall, a bottom wall and a pair of sidewalls. The sidewalls connect within the region between the end surfaces of the top and bottom walls to form a substantially tubular body.

As opposed to Thayer, whose diffuser design comprises essentially a two-part tube, the body of the diffuser of the invention is structurally more rigid and permits the use in fabrication of lighter materials, and materials of lighter gauge. Further, the diffuser of the invention may be "roll formed", a procedure that not only provides overall cost savings, but one which is less costly than procedures followed in fabricating a Thayer-type device.

A cap is received at each of the opposite ends of the body. The caps together with the top wall and sidewalls enclose a chamber within the body and provide a flow path below the bottom edge of the caps for entry of liquid into and an exit of liquid from the body of the diffuser.

As indicated, the diffuser may be used in a sewage treatment installation for purposes of aerating a liquid within an aerating tank. Typically one or more, and preferably a plurality of diffusers are supported along the length of a header which is connected to a source of compressed air external of the aerating tank. In a quiescent condition, the sewage/sludge mixture (hereafter referred to as "the liquid") will completely fill the diffusers, the header, and even a portion of the length of conduit connecting the header to the source of compressed air. Entry of liquid into the system is through the flow path below the bottom edge of each cap at the ends of the body of the diffuser.

In operation, the system is pressurized to gradually force the liquid from the conduit, the header and ultimately a portion of the chamber of each diffuser. The pressure builds to a level, a level at which it is ultimately to be maintained, to develop a liquid/air interface within a region slightly below the level of a plurality of ports formed along the length of the body of the diffuser. Each port provides direct communication to and from the chamber, and when the liquid/air interface is developed air bubbles will exit the ports.

As the pressure within the system builds to a level which at least equals the hydrostatic pressure of the tank, liquid will exit the chamber of the diffuser through the flow path below the end caps which theretofore provided an entry for liquid into the chamber.

The flow path from the body of the diffuser located below the end cap provides an operation considered to be an improvement over the operation of the Thayer diffuser or diffusers of similar nature. To this end, the flow paths allow debris to flush clear of the chamber of the diffuser of the invention. An effective flushing of debris from the chamber of prior art diffusers in all likelihood may not be achieved. Referring to Thayer, debris clearly may settle within the region of the deflector, beyond the end plates.

Further, the extending ends of the caps located above the flow path expose a line of contact that is significantly shorter than the ends of the sidewalls forming the flow paths of Thayer. Consequently, the diffuser of the invention presents structure far less apt to catch foreign material, such as strings, and so forth as may be entrained in the liquid.

The body of the diffuser is supported for operation by connector structure connecting with a nozzle located either at the end of the body or within the region of the middle of the body. The structural make-up of the diffuser of the invention permits use of lighter gauge and lighter weight material in the fabrication of the body. As such, the loading on the connector, at the nozzle, may be reduced significantly.

Several manners and means of support of diffuser and several forms of diffuser body will be described as the description continues.

Each of the forms of diffuser body are generally similar including a plurality of ports within the sidewalls along at least one longitudinal axis. While the specific arrangement of ports may be altered, each diffuser includes end openings below a pair of end caps for purposes as previously discussed. In addition to the function of the end openings in cleaning the diffuser without the necessity of disconnecting the diffuser from the system, the end openings provide an important function in the overall operation of the system. Thus, if the ports should become plugged as the operation continues, air will discharge through the end openings. This manner of discharge of air in all likelihood will provide a distinct bubble pattern at the surface of the liquid. The bubble pattern, thus, is a signal of a clogged and generally unserviceable diffuser.

Other aspects and advantages of the invention will become clear as the description continues.

BEST MODE FOR CARRYING OUT THE INVENTION

Figure 1:
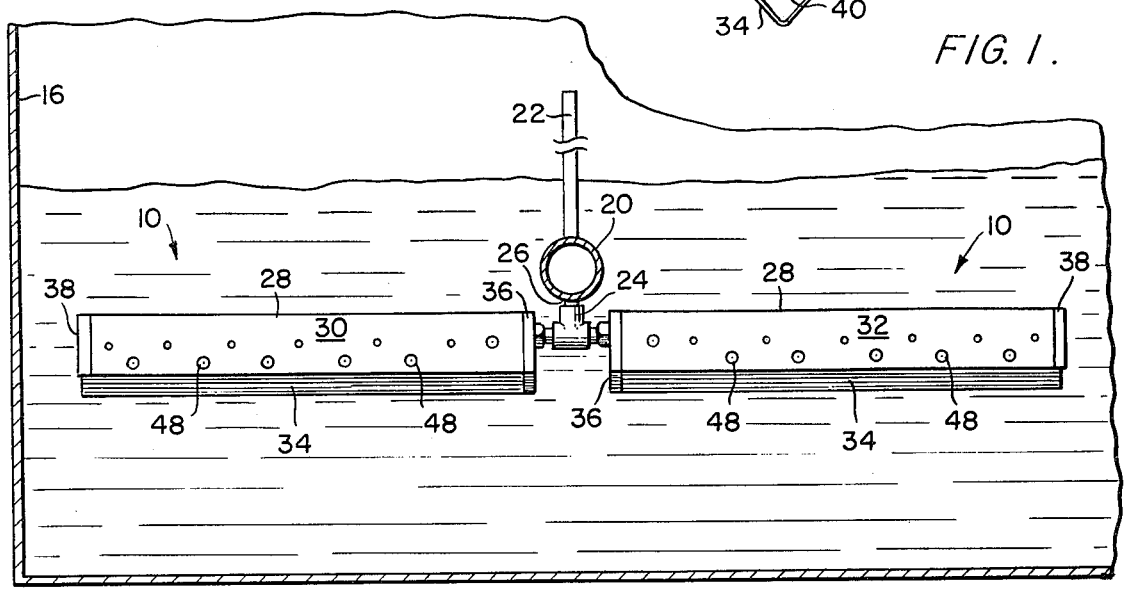
FIG. 1 is an environmental view of a sewage treatment installation and a pair of diffusers of the invention supported by a header in cantilever fashion.

Referring to FIG. 1, the diffuser 10 of the invention utilizing principles of aeration by bubbling a gas through a liquid may be used in an aeration tank in a sewage treatment installation. In this treatment, typically sewage is allowed to flow into the aeration tank, such as tank 12 within which the sewage is mixed with a predetermined volume of sludge, forming a sewage/sludge mixture. The mixture has been and will be referred to herein as a "liquid". Thereafter, a compressed gas, such as air, is introduced into a chamber of the diffuser immersed in the liquid. The gas is introduced into the chamber in a substantially continuous volume, and at a hydrostatic pressure at least equal to the pressure of the tank. The gas and liquid seek a level within the chamber as determined by the volume of gas which shall enter, and the pressure of the entering gas. Once the liquid/gas level is reached, a volume of gas entering into the chamber will displace a substantially like volume of gas which shall exit the chamber to bubble through the liquid. The gas that bubbles through the liquid furnishes oxygen to the liquid so that certain biological changes may take place. Agitation improves the efficiency of transfer of oxygen to the liquid.

The tank 12 may be quite large. To this extent, FIG. 1 illustrates only a portion of a bottom wall 14 and a sidewall 16 comprising one of several sidewalls for confinement of a liquid 18. Because of the size of the tank many diffusers 10 may be used in the sewage treatment process and any particular arrangement of diffusers may be employed. Further, as will be described, the diffusers may be supported at substantially the midpoint along their length (see FIGS. 6–11), or in a cantilever disposition (see FIGS. 1–5, 12 and 13).

A header 20 supports the individual diffusers 10. To be more accurate, a connector is carried by the header and a diffuser or diffusers are supported on the connector. Header 20 is in the form of an elongated tube which may extend substantially across the tank between opposed sidewalls 16. FIG. 1 illustrates only one of an array of headers which may be arranged in parallel relation across the tank. A tube 22 is connected at one end to each header 20 and at the other end to a source of pressure (not shown).

In the form of the invention in FIG. 1, a connector 24, more specifically a plurality of connectors are located along the length of each header, and each connector supports a pair of diffusers. The connector is of T-shape outline and supports a nozzle extending from a diffuser in each of the oppositely extending ports. A tube 26 of stub length is supported in the remaining port and provides closed communication for air under pressure between header 20 and each diffuser. The manner of support, including the support of the tube 22 in header 20, may be a threaded connection of components. In the described arrangement the tube 22 is disposed vertically with respect to bottom wall 14. The headers and each of the diffusers are disposed horizontally with respect to the bottom wall.

A plurality of diffusers or paired groupings of diffusers are located along each header 20. A desirable amount of agitation of the liquid may be obtained by locating the outermost diffusers or outermost paired groupings of diffusers closely adjacent sidewalls 16. Agitation of liquid is enhanced by locating each diffuser or paired groupings of diffusers closely adjacent all surrounding diffusers forming a matrix of diffusers. While the diffusers are parallel to the bottom wall 14 of the tank 12, the diffusers preferably are equidistantly spaced from the bottom wall, as well.

Figure 2:
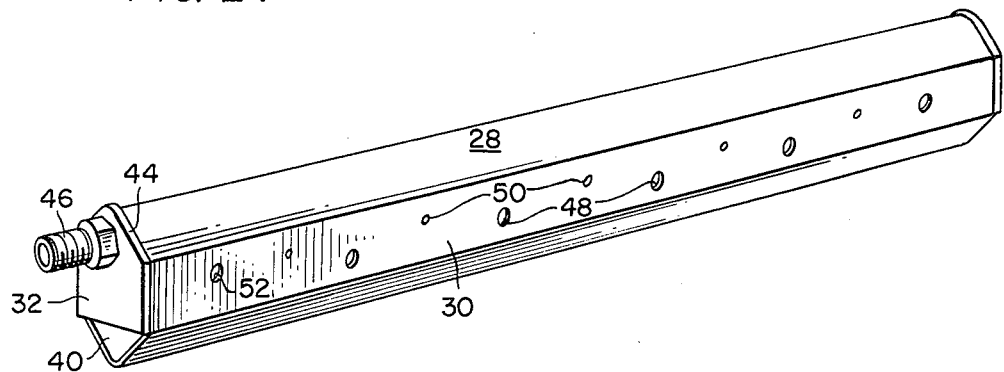
FIG. 2 is a perspective view of the diffuser of FIG. 1, somewhat enlarged.

The diffuser 10 is characterized by an elongated body. Referring specifically to FIGS. 1 and 2, the body includes a top wall 28, a pair of opposed sidewalls 30, 32 and a bottom wall 34. A pair of closure elements in the form of a cap are received at opposed ends of the body for purposes of partially closing entry to the chamber within the diffuser. The body may be formed of a single sheet of material. The sheet material may be rolled and folded at the top (not shown), and since the body is of somewhat tubular, one-piece construction, the gauge of the material may be reduced and still provide integrity in outline.

Figure 4:
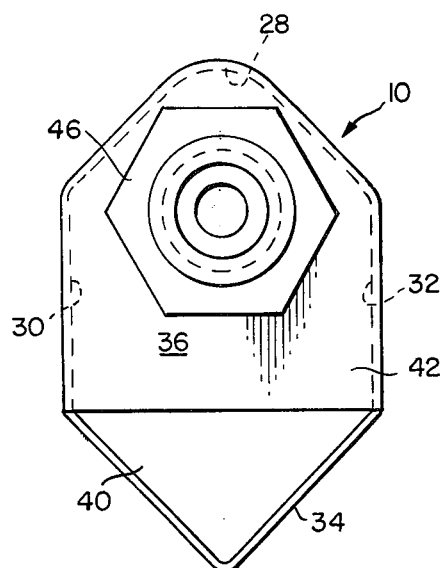
FIGS. 4 and 5 are end views of the diffuser, both of the scale of FIG. 3, illustrating possible cross sections of the body.

The sidewalls 30, 32 are substantially parallel in orientation and extend between the ends of the surfaces of top wall 28 and bottom wall 34, both of which diverge outwardly from an apex (see FIG. 4). The apex of top wall 28 is of somewhat more rounded configuration than the apex of bottom wall 34. The apices are located along the vertical axis of the body, and the body is substantially symmetrical in vertical section.

Figure 5:
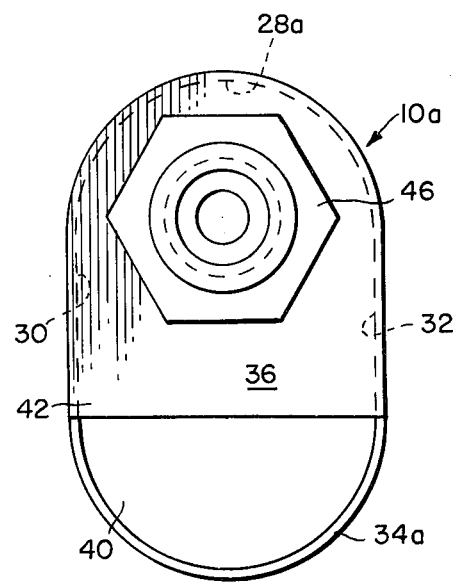

In contrast, the body of diffuser 10a (see FIG. 5) includes a top wall 28a more rounded in configuration than the top wall 28, and a bottom wall 34a which is similarly rounded. The sidewalls are substantially parallel in orientation and extend to a point of tangency with the arc of both top wall 28a and bottom wall 34a. The cross-section of the body of diffuser 10a takes an elongated oval configuration. The diffuser of FIG. 5 is illustrative of one of several possible alternative outlines of diffusers within the scope of the invention. To this end, both FIGS. 4 and 5, and the diffusers to be described which are mounted to a connector at the midregion, provide a large, unrestricted opening and flow path 40 for movement of liquid into the chamber and from the chamber of the diffuser.

Caps 36, 38 close the ends of the diffuser above the flow path. The caps include a surface 42 substantially coextensive in outline to the cross section of the body of diffuser 10, and a flange 44 extending from the surface for telescoping about the body of the diffuser. The caps may be welded or otherwise secured to the body of the diffuser.

A nozzle 46 is formed integral with or otherwise connected to the surface of one cap for accomplishing the connection heretofore described.

A plurality of ports 48 are located along the length of the body of diffuser 10. The ports are formed within a sidewall, preferably both sidewalls 30, 32, in a position closer to bottom wall 34 than to top wall 28. In a preferred embodiment, a plurality of five (5) ports may be located in each sidewall at substantially equidistant spacing. Without any intent to limit the invention, but rather to more particularly describe the construction of the diffuser through reference to dimensional criteria, it may be considered that the body of diffuser 10 is of an overall length of 24 inches (about 61 cm), a width of 2 inches (about 5.1 cm) and a height of 3.375 inches (about 8.6 cm). Each sidewall may be of a width equal to about twice the height of either the top wall or bottom wall, and substantially equidistantly spaced between the apices of the body of the diffuser. A first port 48 may be located approximately 6 inches (15.25 cm) from the end of the diffuser to which cap 36 is located (a first or nozzle end) and the remaining ports may be located on approximately 4 inch (10.2 cm) centers toward the other end of the diffuser. Each port 48 may provide an opening having a diameter of about 0.375 inch (0.95 cm) and comprises a primary air hole. A second plurality of ports 50 are formed within the sidewalls 30, 32, as well. The ports 50 are disposed slightly above ports 48. For example, ports 50 may be spaced approximately 1 inch (2.54 cm) above bottom wall 34 and approximately 0.375 inch (0.95 cm) above ports 48. A first of these ports is located approximately 4 inches (10.16 cm) from the first end and the ports are located on approximately 4 inch (10.16 cm) centers toward the other end of the diffuser. The ports 50 provide secondary air holes. Finally, a port 52 is spaced between the first of ports 50 and the first end of the diffuser. Port 52 is located on the same longitudinal axis as ports 50, approximately equidistant between the first end and the first of ports 50 and provides an opening having a diameter substantially equal to the diameter of ports 48. The port 52 is located generally in the path of flow of air through the nozzle 46 and into the diffuser chamber.

Caps 36, 38 substantially duplicate one another. To this end, the caps include a surface 42 and flange 44 and the cap 36 further includes a nozzle 46 extending outwardly of the surface. Cap 36 may be seen perhaps to best advantage in FIG. 3. While the caps and the body of the diffuser may be made of any material suitable for use, for purposes of example and not to otherwise limit the invention, it may be stated that a successful embodiment of the invention has included caps cast of type 304 L stainless steel (the cap 36, preferably, is a ASTM 296, Grade CF 3 material) and a body formed of a 22-gauge, type 304 L stainless steel.

Nozzle 46 includes a threaded length 54 and a series of flats 56 in an hexagonal pattern adjacent surface 42. The series of flats provide wrench receiving surfaces for connecting the nozzle, and diffuser 10, to connector 24. An orifice 58 in the form of a cup-shaped member is received within nozzle 46. The orifice provides a flow path reduced in diameter from that of the nozzle, serving as a flow control orifice.

Flange 44 extends rearwardly of surface 42. An annular cut 60 is formed around the flange to a depth substantially equal to the thickness of the wall of the body of diffuser 10. The annular cut, defining a shoulder 62 provides a supporting surface for the end of the body of diffuser 10 closed by caps 36, 38. The annular cut will have a depth to receive the body of the diffuser and the structure may be welded.

Figure 12:
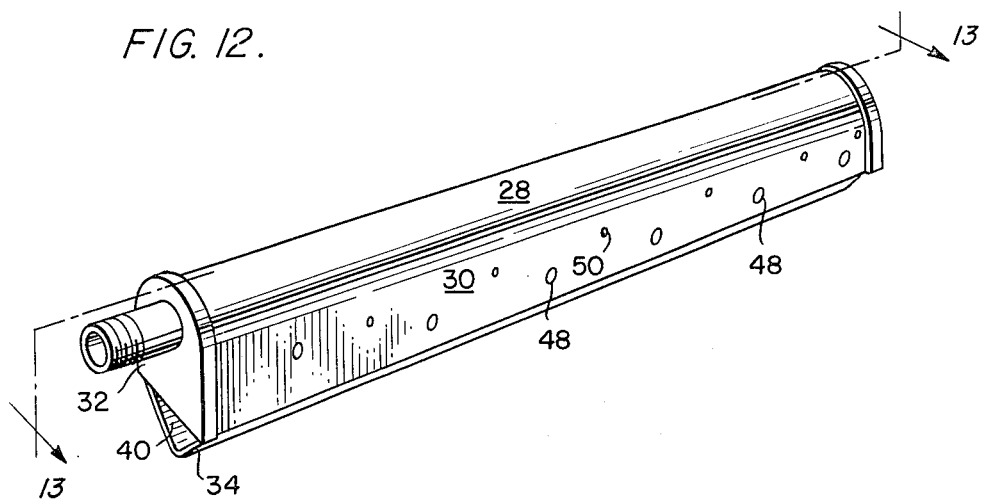
FIG. 12 is a view like that of FIG. 2 illustrating yet an additional modification in the mounting of a diffuser.
Figure 13:
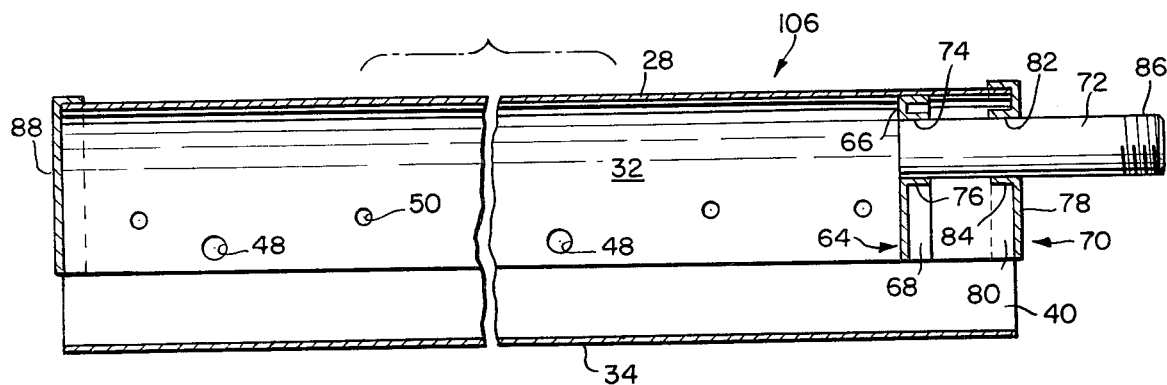
FIG. 13 is a view in section as seen along the line 13—13 in FIG. 12.

Referring to FIGS. 12 and 13, a plate 64 having a surface 66 and a flange 68 is supported within the diffuser 10b at a location spaced from the end normally partially closed by cap 70. Surface 66 is planar in outline and generally coextensive in area to a cross-sectional area within diffuser 10b bounded by top wall 28 and sidewalls 30, 32. Flange 68, thus, extends along an inner surface of these walls and provides a surface which may be welded or otherwise immovably supported within the body of the diffuser. The plate 64 assists in supporting a nozzle 72 which serves to mount the diffuser to connector 24. To this end, an opening 74 is formed in surface 66 and a cylindrical collar 76 is supported either within the opening or around the opening. The internal diameter of collar 76 is slightly in excess of the external diameter of nozzle 72.

Cap 70 and plate 64 are formed somewhat similarly. To this end, the cap has a surface 78 planar in outline and coextensive in area to a cross-sectional area including the plane of the outer surface of top wall 28 and sidewalls 30, 32. A flange 80 extends from the surface. When cap 70 is received on the body of the diffuser 10b, the flange extends along the outer surface of the walls. Flange 80, also, provides a surface which may be welded or otherwise immovably supported exteriorly of the body of the difusser.

An opening 82 is formed in surface 78 and a cylindrical collar 84 is supported either within the opening or around the opening. Collars 76, 84 are located coaxially and extend toward one another within the body of diffuser 10b. If the support plate 64 is located inwardly of the end of the diffuser 10b by a short distance to provide a spacing between collars, adequate stabilization of the diffuser on the nozzle is obtained. Without any intent to limit the invention, but rather to describe another workable embodiment, it has been found that the plate 64 may be spaced about 1.5 inches (about 3.8 cm from the end of diffuser 10b). Each collar may be about 0.36 inch (about 0.9 cm) in length. As illustrated, diffuser 10b may be slidably received and secured on the end of nozzle 72 which, in turn, may be threaded at 86 to provide a threaded engagement of the nozzle within one of the opposite ports of connector 24.

Cap 88, aside from its overall planar face construction, will have a structural configuration like that of cap 70, and the cap may be mounted to the body of diffuser 10b in a like manner, also.

The diffuser 10 may be mounted to header 20 at a midregion location along the body (see FIGS. 6-11). The discussion to follow will be directed primary to the mounting of a diffuser on a header. In this connection, the particulars of the diffuser may be considered, except for the location of ports 48, 50 and 52, and the construction of caps 36, 38, to be as previously discussed. As to the caps, both caps duplicate the cap 38. The ports only include ports 48, 50 which are arranged so that a primary port 48 is arranged on either side of the inlet of air into the chamber of the diffuser, and the ports alternate with secondary ports 50 toward each end of the diffuser.

Figure 6:
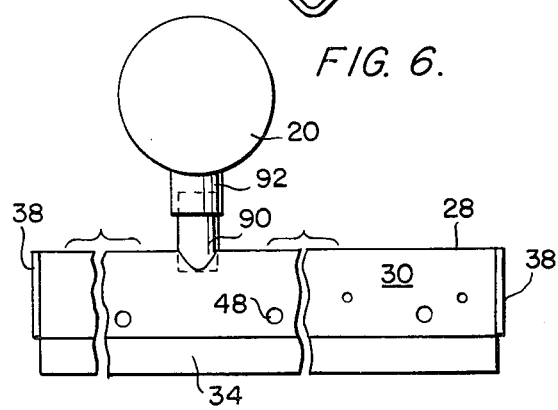
FIG. 6 is a view generally similar to FIG. 1 of a diffuser supported at a central location by a header.
Figure 7:
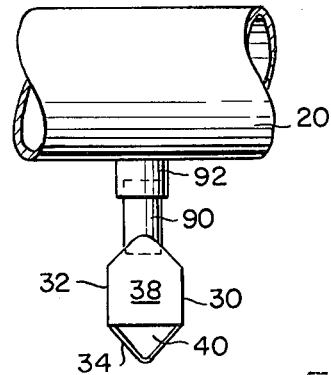
FIG. 7 is a view of the structure looking in a direction normal to the direction in FIG. 6.

Turning to FIGS. 6, 7, a half nipple 90 is supported within top wall 28, at a location substantially between the end caps. A half coupling 92 is likewise supported within a bottom arcuate portion of header 20. The coupling and the nipple are threaded for mounting the diffuser on the header. A plurality of diffusers are located along the header. An orifice (not shown), but similar to orifice 58, is located within the nipple to control flow.

Figure 8:
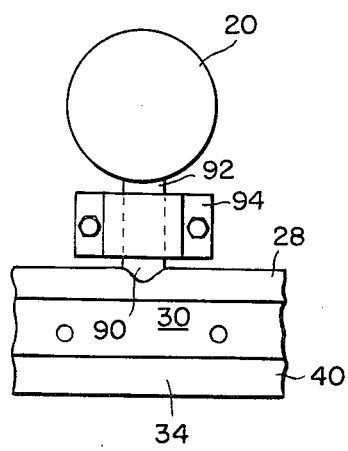
FIGS. 8 and 9 are views like FIGS. 6 and 7 illustrating a modification in the mounting of a diffuser.
Figure 9:
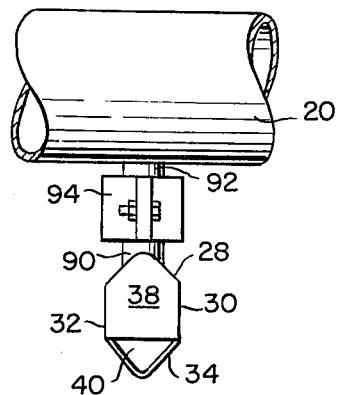
Figure 3:
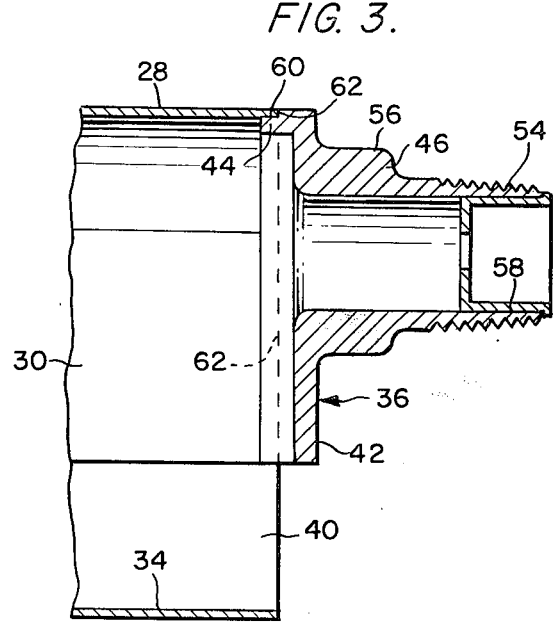
FIG. 3 is a partial sectional view of an end of the diffuser of FIG. 1, again somewhat enlarged, illustrating the support of the diffuser on the header.

FIGS. 8, 9 illustrate another manner of mounting a diffuser. This form of mounting substantially duplicates the mounting of FIG. 6, 7 except the nipple is provided with a Victaulic groove (not shown) and a Victaulic coupling 94 connects the nipple and coupling 92. The Victaulic coupling formed by a pair of plates is secured together by mechanical means, such as machine screws, nuts and bolts, for example. The nipple, likewise, carries an orifice for the purpose previously set out.

The manner of mounting of the diffuser according to FIGS. 8, 9 will permit a spacing between diffusers closer than that obtainable with the mounting technique of FIGS. 6, 7.

Figure 10:
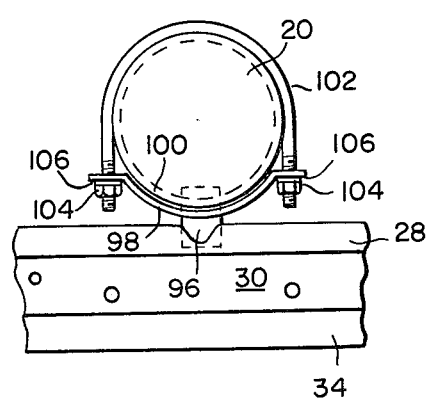
FIGS. 10 and 11 are views like FIGS. 6 and 7 illustrating a further modification in the mounting of a diffuser.
Figure 11:
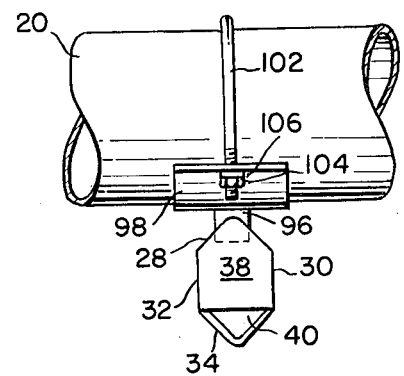

Referring to FIGS. 10, 11, there is illustrated a nipple 96 which extends from diffuser 10. The nipple may include a shoulder (not shown) or the equivalent, and a saddle 98 is supported on the nipple between the diffuser and header. The saddle is arcuate in outline and the header is supported within the recess. The nipple includes an orifice (not shown) which enters into the interior of the header. A gasket 100 which surrounds the nipple is disposed between the surfaces of the header and recess. A U-bolt 102 surrounds surrounds the header and extends through an aperture on opposite sides of the saddle. The ends of the U-bolt are threaded. A tight connection between the header and diffuser may be obtained by a pair of nuts 104 and lock washers 106.

In operation of all forms of diffuser, compressed air from a suitable source is communicated to the chamber within the diffuser. The communicating line includes a nozzle (38 or 90), connector 24, header 20 and tube 22 connected to a source of pressure. The diffuser, situated with aeration tank 12 below the surface of the sewage/sludge mixture, functions in a manner whereby the mixture will move freely into and out of the chamber through the flow path 40 as the compressed air entering through the nozzle and the liquid seek a level within the chamber. Movement of the liquid through the end openings allows debris to flush clear of the chamber of the diffuser.

The compressor, the installation alternatively may employ a pump, is adjusted to deliver air to the chamber under pressure sufficient to meet operating conditions and requirements. To this end, the pressure of the air must be at least equal to the hydrostatic pressure within the tank at the level of ports 48 thereby to reduce the level of the liquid within the chamber to a level slightly below the level of ports 48 comprising the primary air openings. Thus, air under pressure is able to exit these ports to agitate and bubble through the liquid within the aeration tank.

The air which shall exit the ports within the region of the level of the mixture and bubble through the liquid will create currents and agitate the liquid in the transfer of oxygen to the mixture.

In the event of a clogging of the ports 48 compressed air will discharge through the end openings providing two distinct bubble patterns at the surface of liquid 18. The bubble pattern will be an indication that service is required.

I claimed:

1. Diffuser apparatus for use in an aerating tank of a sewage treatment installation comprising
   (a) a body elongated in length and of one-piece construction including
      (1) a top wall,
      (2) a bottom wall, and
      (3) a pair of sidewalls connecting an end surface of the top and bottom walls providing a substantially tubular outline;
   (b) a cap received on opposite ends of said body, said caps, together with said top wall and sidewalls, serving as a boundary of a chamber within said body, and locating a flow for liquid in said aerating tank and between said aerating tank and body to a path located below the lower edge of said caps;
   (c) a nozzle for connecting a compressed gas to said chamber, said nozzle being mounted to said body substantially midway along said top wall, and
   (d) a plurality of port openings in a sidewall adapted to pass gas under pressure into a liquid in said aerating tank.

2. The diffuser apparatus of claim 1 wherein the plurality of port openings are located in each sidewall along at least one longitudinal axis.

3. The diffuser of claim 2 including a plurality of port openings located along each of a pair of longitudinal axes, said port openings located along the longitudinal axis closer to said bottom wall comprising primary port openings of a size larger than said port openings located along the other longitudinal axis.

4. The diffuser of claim 1 wherein said sidewalls are parallel and said bottom wall converges from said sidewalls toward an apex.

5. The diffuser of claim 1 wherein said sidewalls are parallel and extend to a point of tangency with said bottom wall having an overall rounded configuration.

6. Diffuser apparatus for use in an aerating tank of a sewage treatment installation comprising
   (a) a body elongated in length and of one-piece construction including
      (1) a top wall,
      (2) a bottom wall, and
      (3) a pair of sidewalls connecting an end surface of the top and bottom walls providing a substantially tubular outline;
   (b) a cap received on opposite ends of said body, said caps, together with said top wall and sidewalls, serving as a boundary of a chamber within said body, and locating a flow for liquid in said aerating tank and between said aerating tank and body to a path located below the lower edge of said caps;
   (c) a nozzle,
   (d) means at one end of said body supporting said nozzle, said nozzle including connection means for connecting said chamber to a source of compressed air;

(e) a plurality of port openings in a sidewall adapted to pass gas under pressure from said chamber into a liquid in said aerating tank.

7. The diffuser of claim 6 wherein said nozzle support means comprises a unitary cap and nozzle, said cap including a planar surface extending above said flow path and a flange extending from said surface in a direction opposite to that of said nozzle, and an annular cut providing an outer shoulder, said body of said diffuser along said top wall and sidewalls received in said annular cut.

8. The diffuser apparatus of claim 6 wherein the plurality of port openings are located in each sidewall along at least one longitudinal axis.

9. The diffuser of claim 8 including a plurality of port openings located along each of a pair of longitudinal axes, said port openings located along the longitudinal axis closer to said bottom wall comprising primary port openings of a size larger than said port openings located along the other longitudinal axis.

10. The diffuser of claim 6 wherein said sidewalls are parallel and said bottom wall converges from said sidewalls toward an apex.

11. The diffuser of claim 6 wherein said sidewalls are parallel and extend to a point of tangency with said bottom wall having an overall rounded configuration.

12. The diffuser of claim 6 wherein said nozzle support means includes a plate, said plate having an outline substantially coextensive with one of said caps, means supporting said plate within said body in spaced, parallel relation to said cap, each said plate and cap having an opening, and said nozzle supported within said openings.

13. The diffuser of claim 12 further including a collar mounted to each of said cap and plate and surrounding said openings, said collars extending toward one another within said space to provide support for said nozzle.

14. In a sewage treatment installation comprising a tank confining a liquid to be treated, at least one diffuser apparatus including a body elongated in length and of one-piece construction having a top wall, a bottom wall and a pair of sidewalls connecting an end surface of the top and bobtom walls to provide a substantially tubular outline, a cap received on opposite ends of said body, said caps together with said top wall and sidewalls serving as a boundary of a chamber within said body and locating a flow for liquid in said aerating tank and between said aerating tank and body to a path located below the lower edge of said caps, a nozzle for connecting a compressed gas to said chamber, means at one end of said body for supporting said nozzle to said body, plurality of port openings in a sidewall adapted to pass gas under pressure into a liquid in said tank, a header adapted to be connected to a compressed gas from a source, and means for connecting said nozzle and header.

15. The sewage treatment installation of claim 14 wherein said nozzle support means comprises a unitary cap and nozzle, said cap including a planar surface extending above said flow path and a flange extending from said surface in a direction opposite to that of said nozzle, and an annular cut providing an outer shoulder, said body of said diffuser along said top wall and sidewalls received in said annular cut.

16. The sewage treatment installation of claim 14 wherein said port openings are located along at least one longitudinal axis, and wherein said compressed gas at least at a hydrostatic pressure equal to that of said tank will enter into said chamber and exit from said port openings to bubble through said liquid and aerate the same.

* * * * *

UNITED STATES PATENT AND TRADEMARK OFFICE
CERTIFICATE OF CORRECTION

PATENT NO. : 4,474,714
DATED : October 2, 1974
INVENTOR(S) : Ernest W. Downs

It is certified that error appears in the above-identified patent and that said Letters Patent are hereby corrected as shown below:

Col. 8, line 12, "I claimed:" should be --I claim:--

Col. 10, line 8, "bobtom" should be --bottom--.

Signed and Sealed this

Fourteenth Day of May 1985

[SEAL]

Attest:

DONALD J. QUIGG

Attesting Officer        Acting Commissioner of Patents and Trademarks